UNITED STATES PATENT OFFICE.

JOSEF RAWITZER, OF CHARLOTTENBURG, GERMANY.

VITREOUS CEMENT FOR PLUGGING TEETH AND PROCESS OF MANUFACTURING THE SAME.

No. 831,185.　　　Specification of Letters Patent.　　　Patented Sept. 18, 1906.

Application filed February 12, 1906. Serial No. 300,737.

*To all whom it may concern:*

Be it known that I, JOSEF RAWITZER, doctor of philosophy, chemist, a subject of the King of Prussia, German Emperor, residing at 71 Kantstrasse, Charlottenburg, in the Kingdom of Prussia, German Empire, have invented a new and useful Vitreous Cement for Plugging Teeth and Processes of Manufacturing the Same, of which the following is a specification.

My invention relates to the manufacture of a material which on being triturated with phosphoric-acid salts of the same hardens to form a vitreous cement which is adapted to be used for plugging teeth, for cementing porcelain, and the like.

Hitherto zinc phosphate cements have been almost exclusively used as mineral tooth-plugging materials—that is to say, mixtures composed of highly-burnt oxid of zinc with additions of oxids of the earth-alkaline metals, aluminium, and of silicic acid, &c. These masses are not advantageous because they are not transparent and may be easily dissolved by the acids of the mouth, thus becoming observable in the teeth in an objectionable manner. It has been proposed, however, to prepare transparent tooth-cements, and silicate of aluminium has been used chiefly for the purpose that is, *e. g.*, one part of lime, three parts of silicic acid, and six parts of oxid of aluminium have been melted together and the mass after cooling mixed with a solution of phosphate of tin in phosphoric acid; but even this mass is too soluble in the acids of the mouth, has not sufficient hardness, and shrinks in the teeth, for which reasons the mass has been found impractical. Later the solubility of such tooth-cements was diminished by adding silicate of beryllium to a molten silicate of lime and aluminium. This mass was, however, too brittle, so that it could not be used for making outlines. It was also found to shrink in such a high degree that a secondary caries could not be avoided and the mass could not be used in the phantom and in the teeth out of the mouth.

I have found that a tooth-cement can be made equivalent to the beryllium silicate masses with reference to insolubility, hardness, and transparency, but superior to the beryllium silicate masses with reference to brittleness and shrinking by adding aluminium silicate prepared in a wet way to molten silicate of lime and aluminium, and that aluminium silicate apt for manufacturing a tooth-cement can be prepared by adding a solution of an organic or inorganic aluminium salt to a solution of an alkali silicate mixed with the amount of an hydroxid of alkali required for neutralizing the amount of acid present in the aluminium salt. An aluminium silicate prepared in this way has the composition corresponding to the formula $Al_2O_3SiO_2$. The precipitated silicate of aluminium can be deprived of the greater part of adhering water by drying it over sulfuric acid or moderate heating, in which latter case, however, the fusion of the mass must be prevented. The amount of water in the aluminium silicate can be from three to six per cent. In preparing the tooth-cement according to the present invention I mix, for instance, four to six parts of the said finely-ground aluminium silicate with eight parts of a molten, cooled, finely-ground mixture of one part of oxid of calcium, two parts of silicon anhydrid, and one part of oxid of aluminium. In using the mixture for filling teeth I mix the mass with a solution of phosphoric acid of specific gravity 1.5 containing one hundred and fifty grams of $Al_2O_3$ in one liter. The skilled workman will find by experiment the amount of the phosphoric acid suitable for his special purpose. The proportions can be varied, especially the amount of silicic acid in the molten mass. The calcium oxid may be replaced by magnesia.

Instead of the phosphoric acid for triturating the mixture of the silicates I can also use acid salts of the phosphoric acid—for instance, the acid potassium phosphate or similar compounds of the other light metals, including zinc, if required, with addition of coloring-matters. Compounds of the before-mentioned kind are the oxids, basic phosphates, borates, and silicates, also fluorids of each of the before-mentioned metals alone or corresponding double salts of several of them.

What I claim as my invention, and desire to secure by Letters Patent, is—

1. The process of manufacturing a material designed for the production of cement, consisting in preparing in a wet way aluminium silicate $Al_2O_3SiO_2$, drying the same so that it contains no more than six per cent. of water, mixing the said dried aluminium silicate with a finely-ground material produced by melting lime, aluminium oxid and silicon anhydrid together.

2. As a new article of manufacture a cement composed of a mixture of aluminium silicate containing not more than six per cent. of water, and of a fused mixture of oxid of calcium, oxid of aluminium and of silicon anhydrid.

In testimony whereof I have signed my name to this specification in the presence of two subscribing witnesses.

JOSEF RAWITZER.

Witnesses:
   HENRY HASPER,
   WOLDEMAR HAUPT.